US012797952B2

(12) United States Patent
Pahk et al.

(10) Patent No.: US 12,797,952 B2
(45) Date of Patent: Nov. 17, 2026

(54) THREE-DIMENSIONAL PRINTING KITS

(71) Applicant: PERIDOT PRINT LLC, Palo Alto, CA (US)

(72) Inventors: Ian Pahk, Corvallis, OR (US); Vladek Kasperchik, Corvallis, OR (US); Thomas M. Sabo, San Diego, CA (US); Cory J. Ruud, Corvallis, OR (US); Tienteh Chen, San Diego, CA (US)

(73) Assignee: Peridot Print LLC, Palo Alto, CA (US)

(*) Notice: Subject to any disclaimer, the term of this patent is extended or adjusted under 35 U.S.C. 154(b) by 400 days.

(21) Appl. No.: 18/289,351

(22) PCT Filed: May 10, 2021

(86) PCT No.: PCT/US2021/031492

§ 371 (c)(1),
(2) Date: Nov. 2, 2023

(87) PCT Pub. No.: WO2022/240384

PCT Pub. Date: Nov. 17, 2022

(65) Prior Publication Data

US 2024/0246146 A1 Jul. 25, 2024

(51) Int. Cl.

| | |
|---|---|
| ***B22F 10/14*** | (2021.01) |
| ***B22F 3/24*** | (2006.01) |
| ***B33Y 10/00*** | (2015.01) |
| ***B33Y 30/00*** | (2015.01) |
| ***B33Y 70/10*** | (2020.01) |

(52) U.S. Cl.

CPC .............. *B22F 10/14* (2021.01); *B33Y 10/00* (2014.12); *B33Y 30/00* (2014.12); *B33Y 70/10* (2020.01); *B22F 2003/248* (2013.01)

(58) Field of Classification Search

None

See application file for complete search history.

(56) References Cited

U.S. PATENT DOCUMENTS

2019/0001410 A1 1/2019 Ho et al.

FOREIGN PATENT DOCUMENTS

| | | |
|---|---|---|
| WO | 2020/249999 A1 | 12/2020 |
| WO | 2021/029865 A1 | 2/2021 |
| WO | 2021/045756 A1 | 3/2021 |

*Primary Examiner* — Anthony M Liang

(74) *Attorney, Agent, or Firm* — Dierker & Kavanaugh, P.C.

(57) ABSTRACT

A three-dimensional printing kit, as presented herein, can include a particulate build material and a binder agent. The particulate build material can include from about 80 wt % to 100 wt % metal particles based on the total weight of the particulate build material. The binder agent can include an aqueous liquid vehicle, an acrylic polymer or copolymer latex dispersion, a sulfonated small-molecule dispersed pigment, and a solubilized dihydrazide. A sulfonated small-molecule of the sulfonated small-molecule dispersed pigment can be from about 100 g/mol to about 2000 g/mol. The binder agent can exclude a polymeric dispersant.

15 Claims, 2 Drawing Sheets

THREE-DIMENSIONAL PRINTING KITS

BACKGROUND

Three-dimensional (3D) printing may be an additive printing process used to make three-dimensional solid parts from a digital model. Three-dimensional printing may be used in rapid product prototyping, mold generation, mold master generation, and short run manufacturing. Some three-dimensional printing techniques are considered additive processes because they involve the application of successive layers of build material. This is unlike other machining processes, which often rely upon the removal of material to create the final part. Some three-dimensional printing methods use chemical binders or adhesives to bind build materials together. Other three-dimensional printing methods involve at least partial sintering, melting, etc., of the build material. For some three-dimensional printing methods, at least partial melting of build material may be accomplished using heat-assisted extrusion, and for some other materials (e.g., polymerizable materials), curing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
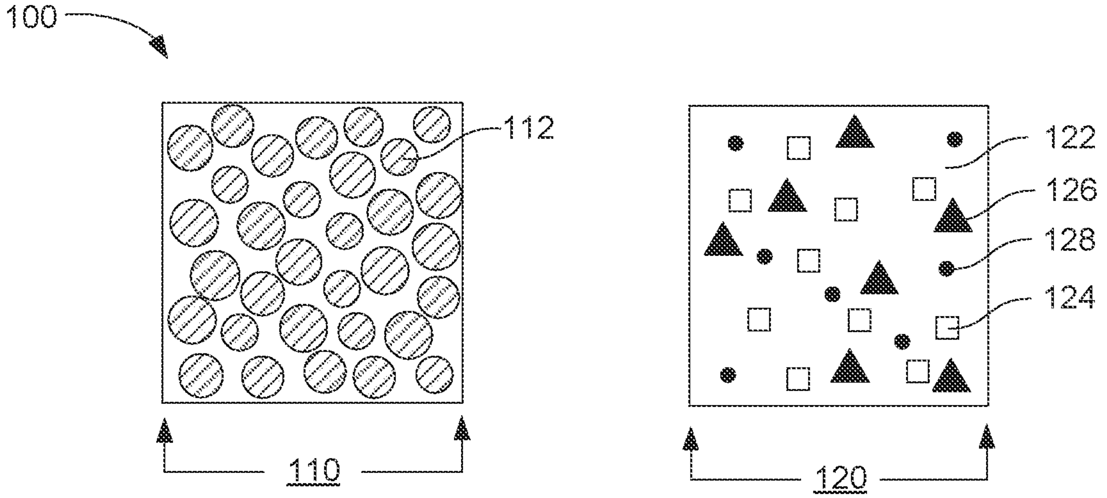
FIG. 1 schematically illustrates an example three-dimensional printing kit in accordance with the present disclosure.

An example 3-dimensional (three-dimensional) printing process can be an additive process that can involve the application of successive layers of build material with chemical binders or adhesives printed thereon to bind the successive layers of build materials together. In some processes, thermal processing can be used to fuse objects formed during printing, such as by melting, sintering, or the like. Thus, layer-by-layer printing can be utilized to form a green body object and then a fusing oven can be used to form a fused metal three-dimensional object. More specifically, a binder agent can be selectively applied to a layer of particulate build material on a build platform to pattern a selected region of the layer and then another layer of the particulate build material is applied thereon. A binder agent can be applied to another layer of the particulate build material and these processes can be repeated to form a green part (also known as a green body) of the three-dimensional printed object that is ultimately formed. The binder agent can be capable of penetrating the layer of the particulate build material onto which it is applied, and/or spreading around an exterior surface of the particulate build material and filling void spaces between particles of the particulate build material. The binder agent can include a binder particle, such as latex, that can hold the particulate build material of the green body or part together. The green body can then be exposed to heat to fuse, e.g., sinter, anneal, melt, or the like, the particulate build material of the green part together and form a fused three-dimensional printed object.

In some three-dimensional printing methods, once the green body is formed and solidified sufficiently, it can often be moved to a separate device for heating at higher temperatures, such as an oven suitable for fusing, e.g., sintering, annealing, melting, or the like, the metal particles together, thereby turning the three-dimensional green body into a fused three-dimensional solid part that is much more rigid. However, to move the green body to the oven, the green body should be stable or rigid enough to make the journey from the protection and support of the particulate build material where it was formed to the oven where it will ultimately be fused, e.g., sintered, annealed, melted, etc. Thus, tensile strength of the green body part can play a role in the robustness of the green body prior to fusing.

In accordance with this, in one example, a three-dimensional printing kit can include a particulate build material and a binder agent. The particulate build material can include from about 80 wt % to 100 wt % metal particles based on the total weight of the particulate build material. The binder agent can include an aqueous liquid vehicle, an acrylic polymer or copolymer latex dispersion, a sulfonated small-molecule dispersed pigment, and a solubilized dihydrazide. A sulfonated small-molecule of the sulfonated small-molecule dispersed pigment can be from about 100 g/mol to about 2000 g/mol. The binder agent can exclude a polymeric dispersant. In an example, the metal particles can be selected from aluminum, titanium, copper, cobalt, chromium, nickel, vanadium, tungsten, tungsten carbide, tantalum, molybdenum, magnesium, gold, silver, ferrous alloy, stainless steel, steel, an alloy thereof, or an admixture thereof. In another example, the metal particles can include ferrous metals, ferrous alloys, or an admixture thereof. In yet another example, the aqueous liquid vehicle can include an organic co-solvent and a weight ratio of the organic co-solvent to the acrylic polymer or copolymer latex dispersion can range from about 1.2:1 to about 3:1. The acrylic polymer or copolymer latex dispersion, in an example, can include acrylate, styrene acrylate, methacrylate, styrene methacrylate, or a combination thereof. In an example, the solubilized dihydrazide can be selected from adipic dihydrazide, isophthalic dihydrazide, pentane dihydrazide, heptane dihydrazide, or a combination thereof. In yet another example, the solubilized dihydrazide can be present at from about 0.1 wt % to about 0.7 wt % in the binder agent. In another example, the small-molecule dispersed pigment can have an average particle size ranging from about 75 nm to about 150 nm. In yet another example the binder agent can have a threshold conductivity limit that can range from about 200 μS/cm to about 450 μS/cm.

A three-dimensional printing system can include a particulate build material, a printhead, and a fusing oven. The particulate build material can include from about 80 wt % to 100 wt % metal particles based on the total weight of the particulate build material. The printhead can be fluidly coupled to or fluidly coupleable to a binding agent to selectively and iteratively eject the binding agent onto successively placed individual layers of the particulate build material to form a green body object, the binder agent comprising an aqueous liquid vehicle, an acrylic polymer or copolymer latex dispersion, a sulfonated small-molecule dispersed pigment, and a solubilized dihydrazide, wherein a sulfonated small-molecule of the sulfonated small-molecule dispersed pigment is from about 100 g/mol to about 2000 g/mol, and wherein the binder agent excludes a polymeric dispersant. The fusing oven can be to receive the green body object and heat fuse the metal particles together to form a fused metal object. In an example, the metal particles include ferrous metals, ferrous alloys, or an admixture thereof. In another example, the solubilized dihydrazide can be selected from adipic dihydrazide, isophthalic dihydrazide, pentane dihydrazide, heptane dihydrazide, or a combination thereof. In yet another example, the binder agent can have a threshold conductivity limit ranging from about 200 µS/cm to about 450 µS/cm.

In another example, a method of three-dimensional printing ("method") can include iteratively applying individual build material layers of a particulate build material that can include from about 80 wt % to 100 wt % metal particles based on the total weight of the particulate build material, and based on a three-dimensional object model, selectively and iteratively applying a binder agent including an aqueous liquid vehicle, an acrylic polymer or copolymer latex dispersion, a sulfonated small-molecule dispersed pigment, and a solubilized dihydrazide to the individual build material layers to define individually patterned layers of a green body object. A sulfonated small-molecule of the sulfonated small-molecule dispersed pigment is from about 100 g/mol to about 2000 g/mol, and the binder agent excludes a polymeric dispersant. The method can also fusing the metal particles of the green body object in a fusing oven. In an example, the method can further include heating the individually patterned layers of the green body object with the particulate build material to further cure the green body object by driving off solvents therefrom prior to separating the green body object from the particulate build material for fusing.

It is noted that when discussing the three-dimensional printing kit, the three-dimensional printing system, and the method of three-dimensional printing herein, each of these discussions can be considered applicable to one another whether or not they are explicitly discussed in the context of that example. Thus, for example, when discussing a small-molecule dispersed pigment related to a three-dimensional printing kit, such disclosure is also relevant to and directly supported in the context of the three-dimensional printing system, methods of three-dimensional printing, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Three-Dimensional Printing Kits

In one example, as illustrated in FIG. 1, a three-dimensional printing kit 100 can include a particulate build material 110 and a binder agent 120. The particulate build material can include from about 80 wt % to 100 wt % metal particles 112 based on the total weight of the particulate build material. The binder agent can include an aqueous liquid vehicle 122, an acrylic polymer or copolymer latex dispersion 124, a sulfonated small-molecule dispersed pigment 126, and a solubilized dihydrazide 128. The binder agent can exclude a polymeric dispersant. A sulfonated small-molecule of the sulfonated small-molecule dispersed pigment is from about 100 g/mol to about 2000 g/mol, and wherein the binder agent excludes a polymeric dispersant, for example. The binder agent can exclude a polymeric dispersant, for example.

Particulate Build Materials

The build material can make up the bulk of the three-dimensional printed object. In examples of the three-dimensional printing kit, three-dimensional printing system, and methods disclosed herein, the build material can include any particulate build material with from about 80 wt % to 100 wt % metal particles based on the total weight of the particulate build material. In other examples, the metal particles can be present in the particulate build material at from about 90 wt % to 100 wt %, from about 95 wt % to 100 wt %, or at 100 wt %. In an example, the build material particles can be a single phase metallic material composed of one element. In this example, the fusing temperature may be below the melting point of the single element. In another example, the build material particles can be composed of two or more elements, which may be in the form of a single phase metallic alloy or a multiple phase metallic alloy. In these other examples, fusing generally occurs over a range of temperatures. With respect to alloys, materials with a metal alloyed to a non-metal (such as a metal-metalloid alloy) can be used as well.

In some examples, the particulate build material can include particles of aluminum, titanium, copper, cobalt, chromium, nickel, vanadium, tungsten, tungsten carbide, tantalum, molybdenum, magnesium, gold, silver, ferrous alloy, stainless steel, steel, alloys thereof, or admixtures thereof. Specific alloy examples can include AlSi 10Mg, 2xxx series aluminum, 4xxx series aluminum, CoCr MP1, CoCr SP2, maraging steel MS1, hastelloy C, hastelloy X, nickel alloy HX, inconel IN625, inconel IN718, stainless steel GP1, stainless steel 17-4PH, stainless steel 316L, stainless steel 430L titanium 6Al4V, and titanium 6Al-4V ELI7. In yet another example, the particulate build material can include particles of ferrous metals, ferrous alloys, or an admixture thereof.

The temperature(s) at which the metal particles of the particulate build material fuse together can be above the temperature of the environment in which the patterning portion of the three-dimensional printing method is performed, e.g., patterning at from about 18 °C to about 300 °C and fusing at from about 500 °C to about 3,500 °C. In some examples, the metal particles may have a melting point that can range from about 500 °C to about 3,500 °C. In other examples, the metal particles may be an alloy having a range of melting points.

The particle size of the particulate build material can be similarly sized or differently sized. In one example, the D50 particle size of the particulate build material can range from about 0.5 µm to about 200 µm. In some examples, the particles can have a D50 particle size distribution value that can range from about 2 µm to about 150 µm, from about 1 µm to about 100 µm, from about 1 µm to about 50 µm, etc. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range).

That being stated, an example Gaussian-like distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 μm means that 50% of the particles (by number) have a particle size greater than 25 μm and 50% of the particles have a particle size less than 25 μm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be essentially referred to as "Gaussian" as used conventionally. In yet other examples, the particles can have a D50 particle size distribution value of from about 2 μm to about 100 μm, from about 5 μm to about 75 μm, from about 25 μm to about 50 μm, from about 5 μm to about 15 μm, or from about 3 μm to about 10 μm. The shape of the particles of the particulate build material can be spherical, non-spherical, random shapes, or a combination thereof.

Binder Agent

In further reference to FIG. 1, regarding the binder agent 120 that may be present in the three-dimensional printing kit 100, the three-dimensional printing system, or utilized in the method of three-dimensional printing as described herein, the binding agent can include acrylic latex particles as a binder. In some examples, the binder agent can also include a sulfonated small-molecule dispersed pigment, a solubilized dihydrazide, an aqueous liquid vehicle, or a combination thereof. Details with respect to the acrylic latex particles, sulfonated small-molecule dispersed pigment, solubilized dihydrazide, and aqueous liquid vehicle are described in further detail below. In some examples, the binder agent can exclude a polymeric dispersant.

The binder agent can have a threshold conductivity limit that can range from about 200 μS/cm to about 350 μS/cm. In yet other examples, the binder agent can have a threshold conductivity limit that can range from about 200 μS/cm to about 300 S/cm, from about 250 μS/cm to about 350 μS/cm, or from about 225 μS/cm to about 325 μS/cm. Conductivity of the binder agent can predict a shelf stability of the binder agent. Conductivities at or below 350 μS/cm can be stable in controlled environments. Conductivities at or below 300 μS/cm can have a multi-year shelf life under ambient temperatures and can remain stable at temperatures up to about 40 °C or about 45 °C/

A binder can bind the particulate build material together during the build process to form a green body object. The term "binder" can include any material used to physically bind the particles of the particulate build material, e.g., metal particles, together or facilitate adhesion to a surface of adjacent particles in order to prepare a green part or green body object in preparation for subsequent heat fusing, e.g., sintering, annealing, melting, etc. During three-dimensional printing, a binding agent can be applied to the particulate build material on a layer by layer basis. The aqueous liquid vehicle of the binding agent can be capable of wetting a particulate build material and the binder can move into vacant spaces between particles of the particulate build material, for example.

The binding agent can provide binding to the particulate build material upon application, or in some instances, can be activated after application to provide binding. For example, a binder can be activated or cured by heating (which may be accomplished by heating an entire layer of the particulate build material or at least a portion of the binding agent which has been selectively applied. The heating may occur at about the glass transition temperature of the acrylic latex, for example. When activated or cured, the acrylic latex can form a network that adheres or glues the particles of the particulate build material together, thus providing cohesiveness in forming and/or holding the shape of the green body object or a printed layer thereof. A "green" part or green body object or article (or individual layer) can refer to any component or mixture of components that are not yet sintered or annealed, but which are held together in a manner sufficient to permit heat fusing, e.g., handling, moving, or otherwise preparing the part for heat fusing.

Thus, in one example, the green body object can have the mechanical strength to withstand extraction from a powder bed and can then be heat fused in a fusing oven, e.g., sintered, annealed, etc., to form a heat fused metal object. Once the green part or green body object has been sintered or annealed, the article can sometimes be referred to as a "brown" article, but more typically herein as a "heat fused" article, part, or object. The term "sinter" or "sintering" refers to the consolidation and physical bonding of the particles together (after temporary binding using the binding agent) by solid state diffusion bonding, partial melting of particles, or a combination of solid state diffusion bonding and partial melting. The term "anneal" or "annealing" refers to a heating and cooling sequence that controls the heating process and the cooling process, e.g., slowing cooling in some instances can remove internal stresses and/or toughen the heat fused part or article (or "brown" part). In some examples, the binder contained in the binding agent can undergo a pyrolysis or burnout process where the binder may be removed during sintering or annealing. This can occur where the thermal energy applied to a green body part or article removes inorganic or organic volatiles and/or other materials that may be present either by decomposition or by burning the binding agent.

Acrylic Polymer or Copolymer Latex Dispersion

Referring now specifically to the acrylic polymer or copolymer latex particles that can be present in a binder agent which can be used to pattern build material and form a three-dimensional green body object, and ultimately a fused three-dimensional object, the acrylic polymer or copolymer latex particles can be a polymer or copolymer that can have different morphologies. In one example, the acyclic polymer or copolymer latex particles can include two different copolymer compositions, which may be fully separated core-shell polymers, partially occluded mixtures, or intimately comingled as a polymer solution. In another example, the acrylic polymer or copolymer latex particles can be individual spherical particles containing polymer compositions of hydrophilic (hard) component(s) and/or hydrophobic (soft) component(s) that can be interdispersed. In one example, the interdispersion can be according to IPN (interpenetrating networks). In yet another example, the acrylic polymer or copolymer latex particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the acrylic polymer or copolymer latex particles can include 2, 3, 4, or more relatively large polymer particles that can be attached to one another or can surround a smaller polymer core. In a further example, the acrylic polymer or copolymer latex particles can have a single phase morphology that can be partially occluded, can be multiple-lobed, or can include any combination of any of the morphologies disclosed herein.

In some examples, the acrylic polymer or copolymer latex particles can be heteropolymers. As used herein, a heteropolymer can include a hydrophobic component and a hydrophilic component. A heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

In some examples, the acrylic polymer or copolymer latex particles can be composed of a polymerization or copolymerization of acrylic monomers, styrene monomers, methacrylate monomers, or a combination thereof. Example monomers can include, C1-C20 linear or branched alkyl (meth)acrylate, alicyclic (meth)acrylate, alkyl acrylate, styrene, methyl styrene, polyol (meth)acrylate, hydroxyethyl (meth)acrylate, (meth)acrylic acid, or a combination thereof. In some examples, the acrylic polymer or copolymer latex dispersion can include acrylate, styrene acrylate, methacrylate, styrene methacrylate, or a combination thereof. In one specific class of examples, the acrylic polymer or copolymer latex particles can be a styrene (meth)acrylate copolymer. The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. pH modifications during preparation or subsequently when added to an ejectable fluid, such as a binder agent, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and other general organic chemistry concepts. In still another example, the acrylic polymer or copolymer latex particles can include a copolymer with copolymerized methyl methacrylate being present at about 50 wt % or greater, or copolymerized styrene being present at about 50 wt % or greater. Both can be present, with one or the other at about 50 wt % or greater in a more specific example. The same can apply to acrylic acid and acrylates.

In other examples, a composition of the acrylic polymer or copolymer latex particles can include acidic monomers. In some examples, the acidic monomer content can range from about 0.1 wt % to about 15 wt %, from about 0.5 wt % to about 12 wt %, or from about 1 wt % to about 10 wt % of the acrylic polymer or copolymer latex particles with the remainder of the acrylic polymer or copolymer latex particle being composed of non-acidic monomers. Example acidic monomers can include acrylic acid, methacrylic acid, dimethylacrylic acid, styrene sulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, or the like.

In one example, the acrylic polymer or copolymer latex particles can be prepared by polymerizing high Tg hydrophilic monomers to form the high Tg hydrophilic component and attaching the high Tg hydrophilic component onto the surface of the low Tg hydrophobic component. In another example, the acrylic polymer or copolymer latex particles can be prepared by polymerizing the low Tg hydrophobic monomers and the high Tg hydrophilic monomers. In yet another example, the acrylic polymer or copolymer latex particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the acrylic polymer or copolymer latex particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method that can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, and combinations thereof; and the high Tg hydrophilic monomers can be selected from acidic monomers, C1 to C2 alkyl acrylate monomers, C1 to C2 alkyl methacrylate monomers, and combinations thereof. The resulting acrylic latex particles can exhibit a core-shell structure, a mixed or intermingled polymeric structure, or some other morphology.

In some examples, the acrylic polymer or copolymer latex can have a weight average molecular weight (Mw) that can range from about 5,000 Mw to about 2,000,000 Mw. In yet other examples, the weight average molecular weight can range from about 100,000 Mw to about 1,000,000 Mw, from about 100,000 Mw to about 500.000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the acrylic polymer or copolymer latex polymer particles can be latent and can be activated by heat (applied iteratively or after green body formation). In these instances, the activation temperature can correspond to the minimum film formation temperature (MFFT) or a glass transition temperature (Tg) which can be greater than ambient temperature. As mentioned herein, "ambient temperature" may refer to room temperature (e.g., ranging about 18 °C to about 22 °C) In one example, the acrylic polymer or copolymer latex particles can have a MFFT or Tg that can be at least about 15 °C greater than ambient temperature. In another example, the MFFT or the Tg of the bulk material (e.g., the more hydrophobic portion) of the acrylic latex polymer particles can range from about 25 °C to about 200 °C. In another example, the acrylic polymer or copolymer latex particles can have a MFFT or Tg ranging from about 40 °C to about 120 °C. In yet another example, the acrylic latex particles can have a MFFT or Tg ranging from about 50 °C to about 150 °C. In a further example, the acrylic polymer or copolymer latex particles can have a Tg that can range from about −20° ° C. to about 130 °C, or in another example from about 60 °C to about 105 °C. At a temperature above the MFFT or the Tg of a latent acrylic polymer or copolymer latex particle, the particles can coalesce and can bind materials.

The acrylic polymer or copolymer latex particles can have a particle size that can be jetted via thermal ejection or printing, piezoelectric ejection or printing, drop-on-demand ejection or printing, continuous ejection or printing, etc. In an example, the particle size of the acrylic polymer or copolymer latex particles can range from about 10 nm to about 400 nm. In yet other examples, a particle size of the acrylic polymer or copolymer latex particles can range from about 10 nm to about 300 nm, from about 50 nm to about 250 nm, from about 100 nm to about 300 nm, or from about 25 nm to about 250 nm.

The acrylic polymer or copolymer latex particles can be present based on a total weight of the binder agent at from about 0.5 wt % to about 20 wt %. In other more detailed examples, the acrylic polymer or copolymer latex particles can be present at from about 8 wt % to about 16 wt %, from about 10 wt % to about 20 wt %, from about 5 wt % to about 15 wt %, or from about 6 wt % to about 18 wt % in the binder agent.

Sulfonated Small-Molecule Dispersed Pigment

The binder agent presented herein can include a sulfonated small-molecule dispersed pigment. As used herein sulfonated small-molecule dispersed pigment refers to dispersed surface modified pigments having a sulfur trioxide group ($SO_3$)—, sulfonate group ($SO_3H$), sulfophenyl group ($C_6H_5SO_3H$), or a combination thereof associated with an outer surface of the pigment. The association can occur through covalent bonding, hydrogen bonding, and/or van der waals interactions. A core of the sulfonated small-molecule dispersed pigment can include a metal phthalocyanine, quinacridone, napthol-AS, mono-azo, di-azo, diketopyrrolo-pyrole, carbon black benzenesulfonic acid, or an admixture thereof. In some examples, the pigment may include a benzenesulfonic acid. Commercially available examples of sulfonated small-molecule dispersed pigments can include Cab-O-Jet® 200, 250C, 265M, and 270M, all commercially available from Cabot Corporation, USA.

The sulfonated small-molecule of the sulfonated small-molecule dispersed pigment can have a molecular weight that can range from about 100 g/mol to about 2000 g/mol, from about 100 g/mol to about 1000 g/mol, from about 1000 g/mol to about 2000 g/mol, from about 500 g/mol to about 1500 g/mol, from about 100 g/mol to about 1000 g/mol, or from about 200 g/mol to about 800 g/mol.

The sulfonated small-molecule pigment of the sulfonated small-molecule dispersed pigment can have an average particle size that can range from about 75 nm to about 150 nm. Particle size information can also be determined and/or verified using a scanning electron microscope (SEM), or can be measured using a particle analyzer such as the MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter. Average particle size can be measured using a particle analyzer such as the MASTERSIZER™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter. In further detail, particle size can be determined and/or confirmed using a scanning electron microscope (SEM). In yet other examples, the small-molecule pigment can have an average particle size from about 75 nm to about 125 nm, from about 100 nm to about 150 nm, or from about 80 nm to about 120 nm.

The sulfonated small-molecule dispersed pigment may be present in the binder agent at from about 0.05 wt % to about 1 wt %, from about 0.1 to about 1 wt %, from about 0.05 to about 0.75 wt %, or from about 0.25 wt % to about 0.75 wt %.

The sulfonated small-molecule dispersed pigment may impart strength to a fused three-dimensional printed object. Without being limited by theory, it is believed that the sulfonated surface groups can prevent interactions between the core of the sulfonated small-molecule dispersed pigment and other components present in the binder agent. For example, the sulfonated surface groups can prevent an interaction between the core of the sulfonated small-molecule dispersed pigment and the solubilized dihydrazide.

Solubilized Dihydrazide

A solubilized dihydrazide, in further detail, can be present in a binder agent of the three-dimensional printing kit, three-dimensional printing system, and/or used in the method of three-dimensional printing. As used herein, "solubilized" indicates that from about 90 wt % to 100 wt % of the dihydrazide is dissolved in the aqueous liquid vehicle of the binder agent. In yet other examples, the solubilized dihydrazide can be from about 90 wt % to about 95 wt % or from about 95 wt % to 100 wt % dissolved in the aqueous liquid vehicle of the binder agent.

Dihydrazides can be represented by the active group shown below.

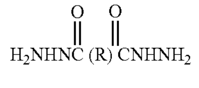

R may be a polyvalent organic radical. In some examples, R may be derived from carboxylic acid. R may have a carbon chain length that can range from about 1 to about 8, from about 2 to about 6, from about 2 to about 8, from about 3 to about 6, or from about 5 to about 6. The R group can be aliphatic or aromatic. In an example, the R group may be aliphatic. In yet another example, the R group may be aromatic. A molecular weight of the solubilized dihydrazide can range from about 130 to about 231, from about 144 to about 216, from about 158 to about 202, or from about 172 to about 220.

In some examples, the solubilized dihydrazide can be selected from adipic dihydrazide, isophthalic dihydrazide, pentane dihydrazide, heptane dihydrazide, or a combination thereof, as shown with additional detail below.

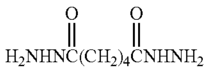

Adipic Dihydrazide (ADH)
Melting Point 180 °C
Molecular Weight 175

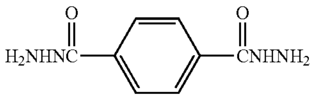

Isophthalic Dihydrazide (IDH)
Melting Point 220 °C
Molecular Weight 195

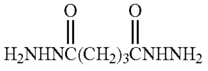

Pentane Dihydrazide)
Melting Point 172.6 °C
Molecular Weight 160.18

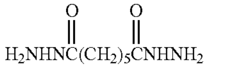

Heptane Dihydrazide
Boiling Point 512.8 °C
at 760 mmHg
Molecular Weight 188.23

In one example, the solubilized dihydrazide can include adipic dihydrazide, isophthalic dihydrazide, or a combination thereof. In another example, the solubilized dihydrazide can include isophthalic dihydrazide.

The solubilized dihydrazide can be present in the binder agent at from about 0.1 wt % to about 0.7 wt %. In other examples, the solubilized dihydrazide can be present in the binder agent at from about 0.1 wt % to about 0.5 wt %, from about 0.3 wt % to about 0.6 wt %, or from about 0.4 wt % to about 0.7 wt %, or from about 0.4 wt % to about 0.5 wt %. In amounts beyond 0.7 wt %, dihydrazides can have solubility constraints and may no longer solubilize in the aqueous liquid vehicle.

The solubilized dihydrazide can act as an adhesion promoting additive. Adhesion promoting additives can allow for reduced curing temperatures of the three-dimensional printed object. The reduced curing temperatures can mitigate powder cohesivity and recyclability issues. In addition, the solubilized dihydrazide can improve green part strength when printed with a sulfonated small-molecule dispersed pigment. The term "curing" should not be confused with "fusing." Curing refers to providing a temperature to the green body object after printing in the powder bed of the particulate build material so that the green body object is sufficiently stable or even to enhance stability further within the powder bed for transfer to a fusing oven. The fusing oven is where the temperature is increased to high fusing temperatures for sintering, annealing, or otherwise forming the solidified metal object.

Aqueous Liquid Vehicle

Turning now to the aqueous liquid vehicle, the aqueous liquid vehicle can make up about 50 wt % to about 90 wt % of the binder agent. In other examples, the aqueous liquid vehicle can be included at from about 60 wt % to about 85 wt %, from about 60 wt % to about 80 wt %, from about 75 wt % to about 90 wt %, or from about 70 wt % to about 80 wt %, based on a total weight of the binder agent.

In some examples, the aqueous liquid vehicle(s) can include water, co-solvents, dispersing agents, biocides, viscosity modifiers, pH adjusters, sequestering agents, preservatives, and the like. In one example, water can be present at from about 30 wt % to 100 wt % of the aqueous liquid vehicle component (e.g., excluding the acrylic polymer or copolymer latex dispersion, the sulfonated small-molecule dispersed pigment, and the solubilized dihydrazide) based on a total weight of the aqueous liquid vehicle. In other examples, the water can be present at from about 50 wt % to about 95 wt %, from about 75 wt % to 100 wt %, or from about 80 wt % to about 99 wt %, based on a total weight of the aqueous liquid vehicle.

A co-solvent can be present at from about 5 wt % to about 50 wt % in the aqueous liquid vehicle, based on a total weight of the binder agent. In yet other examples, the co-solvent can be present at from about 20 wt % to about 40 wt %, from about 15 wt % to about 30 wt %, from about 5 wt % to about 25 wt %, or from about 25 wt % to about 50 wt % in the aqueous liquid vehicle, based on a total weight of the binder agent. A co-solvent may be present in an amount that relates to an amount of the acrylic polymer or copolymer latex dispersion in the binder agent. For example, the co-solvent can be present at about 15 wt % to about 35 wt % and the acrylic polymer or copolymer latex dispersion can be present at about 9 wt % to about 16 wt %. As the amount of co-solvent increases, the amount of acrylic polymer or copolymer latex dispersion in the binder agent can be increased. In an example, the aqueous liquid vehicle can include an organic co-solvent and a weight ratio of the organic co-solvent to the acrylic polymer or copolymer latex dispersion ranges from about 1.2:1 to about 3:1, from about 1.5:1 to about 3:1, or from about 1.2:1 to about 2:1.

Example co-solvents can include aliphatic alcohols, aromatic alcohols, alkyl diols, glycol ethers, polyglycol ethers, 2-pyrrolidinones, caprolactams, formamides, acetamides, long chain alcohols, and combinations thereof. For example, the co-solvent can include aliphatic alcohols with a $—CH_2OH$ group; secondary aliphatic alcohols; 1,2-alcohols; 1,3-alcohols; 1,5-alcohols; ethylene glycol alkyl ethers; propylene glycol alkyl ethers; C6 to C12 homologs of polyethylene glycol alkyl ethers; N-alkyl caprolactams; unsubstituted caprolactams; both substituted and unsubstituted formamides; both substituted and unsubstituted acetamides; combinations thereof; and the like. Other example organic co-solvents can include propyleneglycol ether; dipropylene glycol monomethyl ether; dipropyleneglycol monopropyl ether; dipropyleneglycol monobutyl ether; tripropyleneglycol monomethyl ether; tripropyleneglycol monobutyl ether; dipropyleneglycol monophenyl ether: 2-pyrrolidinone; 2-methyl-1,3-propanediol; 1,2-butanediol; and combinations thereof.

If a surfactant is included in the fluid agent, then the surfactant can include SURFYNOL® SEF, SURFYNOL® 104, SURFYNOL® 440 or SURFYNOL® 2502 (Evonik Industries AG. Germany): CRODAFOST N3 Acid or BRIJ® 010 (Croda International Plc., Great Britain); TERGITOL® TMN6, TERGITOL® 15S5, TERGITOL® 15S7, DOWFAX® 2A1, or DOWFAX® 8390 (Dow, USA); or a combination thereof. The surfactant or combinations of surfactants can be present in the binder agent at from about 0.1 wt % to about 5 wt % based on the total fluid content weight, and in some examples, can be present at from about 0.5 wt % to about 2 wt %.

With respect to antimicrobials, any compound suitable to inhibit the growth of harmful microorganisms can be included. These additives may be biocides, fungicides, and other microbial agents. Examples of suitable microbial agents can include, but are not limited to, NUOSEPT® (Troy, Corp.), UCARCIDE™, KORDEK™, ROCIMA™, KATHON™ (all available from The Dow Chemical Co.), VANCIDER (R.T. Vanderbilt Co.), PROXEL® (Arch Chemicals), ACTICIDER B20 and ACTICIDER M20 and ACTICIDE® MBL (blends of 2-methyl-4-isothiazolin-3-one (MIT), 1,2-benzisothiazolin-3-one (BIT), and Bronopol (Thor Chemicals); AXIDE™ (Planet Chemical); NIPACIDE™ (Clariant), etc.

Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives to modify properties of the binder agent.

Three-Dimensional Printing Systems

Figure 2:
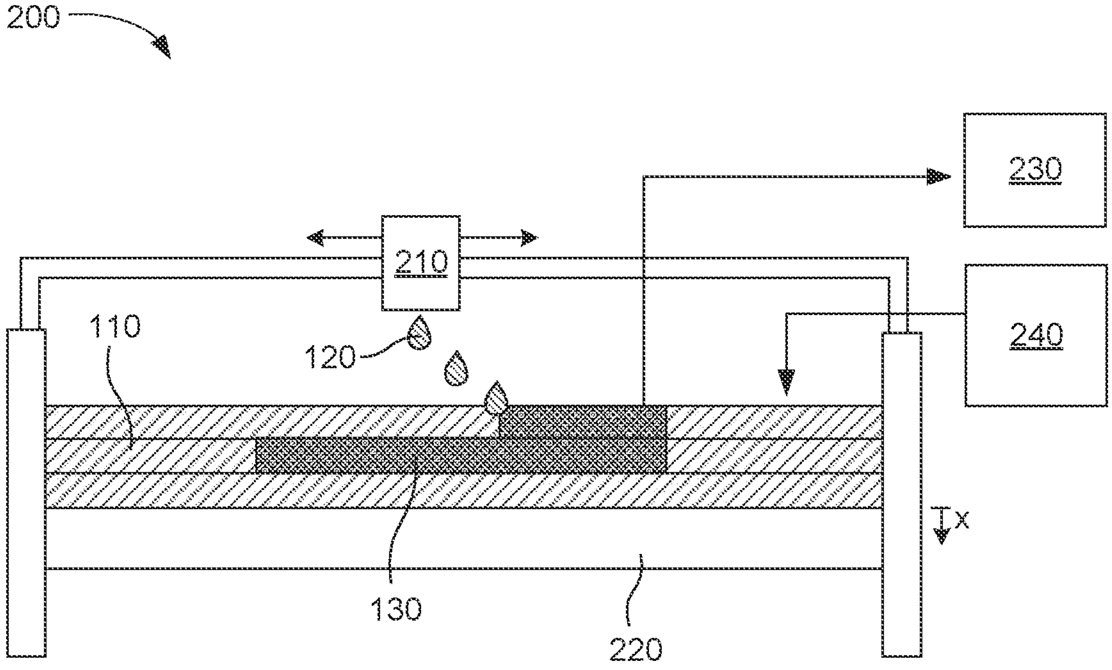
FIG. 2 graphically illustrates an example system for three-dimensional printing in accordance with the present disclosure.

A three-dimensional printing system 200 is illustrated in FIG. 2 by way of example. The system can include a particulate build material 110 and a binder agent 120. The particulate build material can include from about 80 wt % to 100 wt % metal particles based on the total weight of the particulate build material. The binder agent can include an aqueous liquid vehicle, an acrylic polymer or copolymer latex dispersion, a sulfonated small-molecule dispersed pigment, and a solubilized dihydrazide. A sulfonated small-molecule of the sulfonated small-molecule dispersed pigment is from about 100 g/mol to about 2000 g/mol, and wherein the binder agent excludes a polymeric dispersant. The binder agent can exclude a polymeric dispersant. The binder agent can be applied to the particulate build material using a printhead 210, for example. The printhead can be fluidly coupled or coupleable to the binding agent to selectively and iteratively apply the binder agent to the particulate build material to form individually patterned object layers of a green body object. The particulate build material and binder agent can be as described above. The printhead can be on a carriage track or any of a number of structures. The printhead can be fluidly coupled or coupleable to the binder agent and directable to apply the binder agent to the particulate build material to form a layered green body object. The printhead can be any type of apparatus capable of selectively applying the binding agent. For example, the printhead can be a fluid ejector or digital fluid ejector, such as an inkjet printhead, e.g., a piezo-electric printhead, a thermal printhead, a continuous printhead, etc. Thus, in some examples, the application can be carried out by jetting or ejecting from a digital fluid jet applicator, similar to an inkjet pen. In yet another example, the printhead can include a motor and can be operable to move back and forth over the particulate build material along a carriage when positioned over or adjacent to a powder bed of a build platform. The system can also include a fusing oven 230 to receive the green body object 130 after being formed within the particulate build material.

In further detail regarding build in the green body object 130 prior to transfer to the fusing oven 230, the system 200 can further include a build platform 220 to support the particulate build material 110 as illustrated in FIG. 2. The build platform can be positioned to receive the binder agent 120 from the printhead 210 onto a layer of the particulate build material. The build platform can be controlled to drop in height (shown at "x"), thus allowing for successive layers of particulate build material to be applied by a supply and/or spreader 240. The particulate build material can be layered in the build platform at a thickness that can range from about 5 μm to about 1 cm. In some examples, individual layers can have a relatively uniform thickness. In one example, a thickness of a layer of the particulate build material can range from about 10 μm to about 500 μm, or from about 30 μm to about 200 μm. The green body object can then be transferred to the fusing oven. In examples of the present disclosure, a heater can be used to drive solvent, e.g., water, organic solvent, etc., and/or other liquids from the green body object to further cure the green body object prior to moving the green body object to the fusing oven. A heater is not shown, but heat can be provided by any device or structure positioned to heat the green body object built within the particulate build material, e.g., heating using the build platform, an overhead heater, etc.

In further detail regarding the fusing oven 230, this is wherein the particulate build material of mela particles can be fused to convert the green body object (formed from the particulate build material with binding agent applied thereto) to for a heat fused metal object, for example. In some examples, the fusing oven can include a controlled atmosphere, which may include controlling atmospheric pressure or gas content in the atmosphere during the heat fusing process. For example, as mentioned, the pressure within the fusing oven can be a vacuum pressure ranging about 0.1 pascal (Pa) to about 7 Pa, from about 0.5 Pa to about 6 Pa, or from about 1 Pa to about 5 Pa. In some examples, the controlled atmosphere can include an inert atmosphere of a noble gas, an inert gas, a reactive gas, or a combination thereof.

Methods of Three-Dimensional Printing

Figure 3:
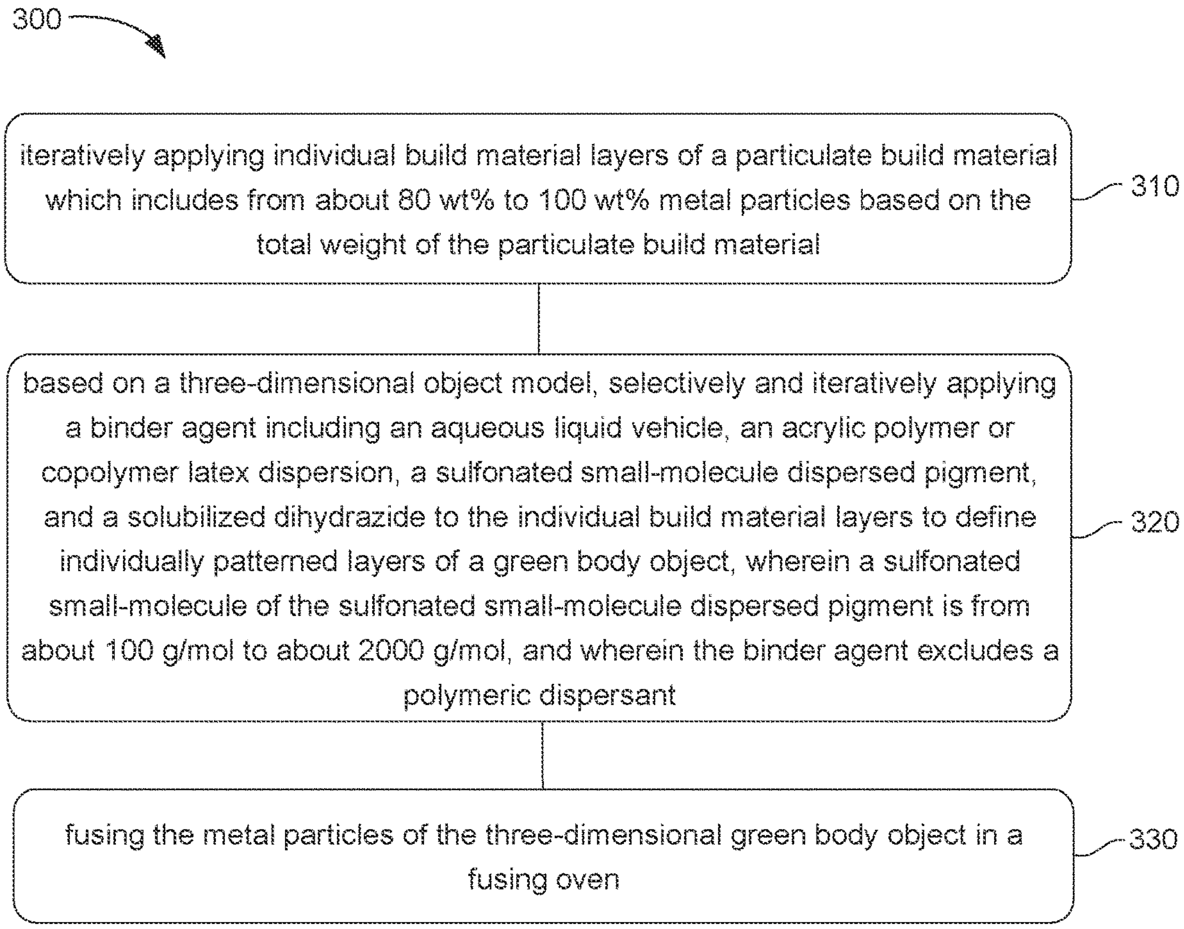
FIG. 3 is a flow diagram illustrating an example method of three-dimensional printing in accordance with the present disclosure.

A flow diagram of an example method of three-dimensional printing 300 is shown in FIG. 3. It is noted that the three-dimensional printing kit and the three-dimensional printing system can be used in the method and can be as described in either of the examples set forth in FIGS. 1-2, for example. The method can include iteratively applying 310 individual build material layers of a particulate build material that can include from about 80 wt % to 100 wt % metal particles based on the total weight of the particulate build material, and based on a three-dimensional object model, selectively and iteratively applying 320 a binder agent including an aqueous liquid vehicle, an acrylic polymer or copolymer latex dispersion, a sulfonated small-molecule dispersed pigment, and a solubilized dihydrazide to the individual build material layers to define individually patterned layers of a green body object. A sulfonated small-molecule of the sulfonated small-molecule dispersed pigment is from about 100 g/mol to about 2000 g/mol, and the binder agent excludes a polymeric dispersant. The method can also fusing 330 the metal particles of the green body object in a fusing oven. In an example, the method can further include heating the individually patterned layers of the green body object with the particulate build material to further cure the green body object by driving off solvents therefrom prior to separating the green body object from the particulate build material for fusing.

The iteratively applying of particulate build material, in further detail, can include depositing the particulate build material from a particulate build material source onto a build platform where the particulate build material may be flattened or smoothed, such as by a mechanical roller or other flattening technique. After an individual layer is printed with binder agent, the build platform can be dropped a distance of (x), which can correspond to the thickness of a printed layer in one example, so that another layer of the particulate build material can be added thereon and printed with binder agent. The process can be repeated on a layer by layer basis until a green body is formed that is stable enough to move to an oven suitable for fusing, e.g., sintering, annealing, or the like.

Selectively and iteratively applying the binder agent can include, for example, ejecting the binder agent onto the particulate build material from a printhead, for example, to provide for selective pattering of the particulate build material. The location of the selective applying of the binder agent can correspond to a layer of a three-dimensional printed object, such as from a three-dimensional object model or computer model.

The acrylic polymer or copolymer latex dispersion can be applied in an amount such that a weight ratio of acrylic polymer or copolymer latex dispersion to particulate build material can be from about 0.15 wt % to about 1.5 wt %, from about 0.3 wt % to 1.2 wt %, or from about 0.6 wt % to 0.9 wt %. In some examples, a binder agent can be applied to a location of the particulate build material at a weight ratio from about 3:97 to about 10:90. In yet other examples the total fluid agent can be applied at a location of the particulate build material at a total weight ratio of from about 5:80 to about 10:90 or from about 3:45 to about 10:90. These weight ratios can ensure that a fluid capacity of the particulate build material is not exceeded.

After an individual particulate build material layer is printed thereon with the binder agent, in some instances the individual build material layer or the layered green body object can be heated to drive off solvent, e.g., water and/or other liquid solvent components, as well as to further solidify the layer of the three-dimensional green body object. The heat can be applied from overhead and/or can be provided by a build platform from beneath the particulate build material. In one example, the heating of the individual build material layer or the layered green body object can occur at a temperature ranging from about 100 °C to about 200 °C to cure the individual build material layer or the layered green body object.

During printing, the build platform can be dropped a distance that can correspond to a thickness of particulate build material that may be spread for the next layer of the green body object or article to be formed, so that another layer of the particulate build material can be added thereon, printed with binder agent, heated, etc. This process can be repeated on a layer by layer basis until the green body object is formed.

Following the formation of the green body object, in one example, the entire green body object can be moved to an oven and fused by sintering and/or annealing. The method can include heating the green body object to a debinding temperature (ranging from about 300 °C to about 550 °C) in order to remove binder via pyrolysis and then heating the green body object to a fusing temperature (which may be a sintering temperature below melting temperature of the metal particles of the particulate build material) ranging from about 600 °C to about 3,500 °C. In some examples, the temperature can range from about 1,200 °C to about 1,400 °C, from about 1,000 °C to about 3,000 °C, or from about 600 °C to about 2,000 °C. The fusing temperature range can vary, depending on the material, but in one example, the fusing temperature can range from about 10 °C below the melting temperature of the metal particles of the particulate build material to about 50 °C below the melting temperature of the metal particles of the particulate build material. In another example, the fusing temperature can range from about 100 °C below the melting temperature of the metal particles of the particulate build material to about 200 °C below the fusing temperature of the metal particles of the particulate build material. For example, a fusing temperature for stainless steel can be about 1400 °C and an example of a fusing temperature for aluminum or aluminum alloys can range from about 550 °C to about 620 °C. The fusing temperature can also depend upon the particle size and period of time that heating occurs, e.g., at a high temperature for a sufficient time to cause particle surfaces to become physically merged or composited together.

During heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the fused three-dimensional object from the oven and cooling (or annealing by controlling the cool down rate in the oven), the fused three-dimensional object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

DEFINITIONS

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "devoid" refers to a numerical quantity that can be zero or can be substantially zero, e.g., a quantity may be permissible in trace amounts, such as up to 0.1 wt % of a formulation or composition.

As used herein, the term "green" when referring to a green part, green body, three-dimensional green body object, green body layer, etc. refers to any intermediate structure that has been solidified and/or cured (prior to heat fusing), furthermore, a green body object can include particulate build material, acrylic latex particles, sulfonated small-molecule pigment, and dihydrazide. The term "green body" generally is used to refer to a multi-layered object that is (weakly) bound together, but upon some water removal, can exhibit sufficient tensile strength to be moved to a fusing oven, for example. It is to be understood that any build material that is not patterned with at least binder agent is not considered to be part of the green body, even if it is adjacent to or surrounds the green body. For example, unprinted particulate build material acts to support the green body while contained therein, but the particulate build material is not part of the green body unless it is printed with binder agent to generate a solidified part prior to fusing.

As used herein, the terms "three-dimensional part," "three-dimensional object," or the like, refer to the target three-dimensional object that is being built, and can be a green body three-dimensional object or a fused three-dimensional object, depending on the context. However, in some instances, for clarity, the three-dimensional object can be referred to as a "fused" three-dimensional object, indicating it has been fused, e.g., sintered, annealed, melted, etc., or a "green body," "three-dimensional green body object," or "green" three-dimensional object, indicating it has been solidified or in the process of solidification sufficient for movement, but not yet heat fused.

"Binder agent" refers to a fluid that includes water and acrylic latex particles that are effective for binding layers of particulate build material when forming a green body. The binder agent is typically applied to form a three-dimensional green body object, and in some cases, can include a sulfonated small-molecule dispersed pigment and a solubilized dihydrazide.

The term "fluid" does not infer that the composition is free of particulate solids, but rather, can include solids dispersed therein, including acrylic latex particles, a sulfonated small-molecule dispersed pigment, or other solids that are dispersed in the aqueous liquid vehicle of the fluid.

As used herein, "material set" or "kit" can be synonymous with and understood to include a plurality of compositions comprising one or more components where the different compositions can be separately contained in one or more containers prior to and/or during use, e.g., building a green three-dimensional object for subsequent fusing. These compositions of the "kit" can be combined together during a three-dimensional build process. The containers can be any type of a vessel, box, or receptacle made of any material.

The term "fuse," "fusing," "fusion," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as if each numerical value and sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Binder Agents

To evaluate the shelf stability and green part strength, various binder agents were prepared by admixing the components in Table 1.

TABLE 1

Binder Agent

| Binder Agent Components | Component Type | Control 1 | Control 2 | Control 3 | B1 | B2 | B3 |
|---|---|---|---|---|---|---|---|
| Proprietary Acrylic Latex Dispersion | Binder | 12 | 12 | 12 | 12 | 12 | 12 |
| 1,2-Butanediol | Co-solvent | 26 | 24 | 18 | 24 | 18 | 18 |
| Dipropylene Glycol | Co-solvent | — | 2 | — | 2 | — | — |
| Tergitol ® 15-S-7 | Surfactant | 0.9 | — | — | — | — | — |
| Tergitol ® TMN-6 | Surfactant | 0.9 | 0.5 | 0.5 | 0.5 | 0.5 | 0.5 |
| Surfynol 2502 | Surfactant | — | 1 | 1 | 0.9 | 1 | 1 |
| Isophthalic Dihydrazide (IPDH) | Solubilized Dihydrazide | — | 0.68 | 0.45 | 0.5 | 0.45 | 0.45 |
| JPD HCB Dye | Colorant | 0.4 | 0.4 | 0.4 | — | — | — |
| COJ 265-M Pigment | Colorant | — | — | | 0.6 | 0.6 | — |
| COJ 250-C Pigment | Colorant | — | — | — | — | — | 0.6 |
| Water | Solvent | Balance | Balance | Balance | Balance | Balance | Balance |

| Binder Agent Components | Component Type | B4 | B5 | B6 |
|---|---|---|---|---|
| Proprietary Acrylic Latex Dispersion | Binder | 12 | 12 | 12 |
| 1,2-Butanediol | Co-solvent | 26 | 26 | 26 |
| Tergitol ® 15-S-7 | Surfactant | 0.9 | 0.9 | 0.9 |
| Tergitol ® TMN-6 | Surfactant | 0.9 | 0.9 | 0.9 |
| COJ 260-M Pigment | Colorant | 0.1-0.3 | — | — |
| COJ 265-M Pigment | Colorant | — | — | 0.1-0.4 |
| COJ 250-C Pigment | Colorant | — | 0.1-0.4 | |
| Water | Solvent | Balance | Balance | Balance |

Tergitol ® is commercially available from Sigma Aldrich (USA); Surfynol ® is commercially available from Evonik Industries AG, Germany; COJ 260-M, COJ 265-M, and COJ 250-C are commercially available from Cabot Corporation, USA.

The stability of the binder agents was observed by storing the binder agents at 60 °C for up to 12 weeks. After 2 weeks in storage Control 1 coagulated and was no longer fit for analysis. No significant changes were noted in the other binder agent formulations.

Example 2—Flexural Strength

A flexural strength test was conducted of several of the binder agents prepared in accordance with Table 1. The binder agents tested were admixed with 100 wt % stainless steel particles having a D90 particle size of about 22 μm to prepare pressed bar samples, in triplicate with each binder agent, which were essentially solidified green body samples having a dimension of 50 mm (length) by 12 mm (width) by 5.5 mm (thickness). The admixture was mixed in a high speed mixer to ensure homogenous mixing at a weight ratio of about 19:1 (94.8 wt % stainless steel particles; 5.2 wt % binder fluid) and then the wet particles/binder homogenous mixture was dried in a vacuum oven at 30 °C for one hour to remove most of the water content, leaving a dried homogenous mixture of binder solids and stainless steel particles. 18 g of the dried homogenous mixture was poured into the opening of a press bar mold and pressed under 2000 psi for 30 seconds to form the respective press bar samples. The individual press bar samples were then carefully separated from the mold and cured in a vacuum oven at 130 °C at 25-28 in Hg for 60 minutes with a slow stream of air to provide for removal of solvents and some or even full curing of latex binder. The individual cured press bar samples were then cooled and submitted to a 3-point bend Instron® tester to measure their flexural strength. The Instron® tester, available from Instron (USA), included a support, supporting pins, and a loading pin which applied increasing force (F) to the individual press bar samples until they failed (broke under force).

TABLE 2

Flexural Strength

| Press Bar Sample | Green Part Strength (MPa) | | | | |
|---|---|---|---|---|---|
| Binder Agent | 1 | 2 | 3 | 4 | 5 |
| Control 1 | 3 | 2.9 | 2.7 | 3.1 | — |
| Control 2 | 9.8 | 10.1 | 9.1 | 10.2 | 9.5 |
| Control 3 | 8.2 | 7.3 | 8.2 | 7.5 | 8.4 |
| B1 | 12.1 | 11.2 | 11.4 | 11.7 | — |
| B2 | 12.7 | 13.1 | 11.9 | 12.1 | 13.2 |
| B3 | 11.6 | 13.1 | 11.2 | 11.3 | 10.4 |

The individual press bar samples formed with binder formulations that incorporated a transition metal containing dye (Control 1, 2, and 3) exhibited significantly lower strength than the individual press bar samples that were formed with binder formulations that included a sulfonated small-molecule dispersed pigment and a solubilized dihydrazide (B1, B2, and B3). It is believed that the superior green part strengths produced by including B1 and B2 can be attributed to the included sulfonated small-molecule dispersed pigment not inherently or intentionally containing transition metal ions. And, while the sulfonated small-molecule dispersed pigment included in B3 does inherently contain transition metal ions, those ions were not exposed to the aqueous liquid vehicle components and the solubilized dihydrazide because most of those transition metal ions are buried inside of the pigment particles and shielded from the bulk vehicle composition. Whereas, the transition metal containing dye contained in Control 1, 2, and 3 was fully solvated, which exposed those transition metal ions to the liquid vehicle and allowed them to interact with other aqueous liquid vehicle components. The solubilized dihydrazide was consequentially deactivated as an adhesion promoting additive due to the strong, competing interactions with the transition metal containing dyes.

What is claimed is:

1. A three-dimensional printing kit, comprising:

a particulate build material comprising from about 80 wt % to 100 wt % of metal particles based on a total weight of the particulate build material; and a binder agent comprising:

an aqueous liquid vehicle;

an acrylic polymer or copolymer latex dispersion;

a sulfonated small-molecule dispersed pigment; and a solubilized dihydrazide, wherein a sulfonated small-molecule of the sulfonated small-molecule dispersed pigment has a molecular weight ranging from about 100 g/mol to about 2000 g/mol, and wherein the binder agent excludes a polymeric dispersant.

2. The three-dimensional printing kit of claim 1, wherein a metal of the metal particles is selected from the group consisting of aluminum, aluminum alloy, titanium, titanium alloy, copper, copper alloy, cobalt, cobalt alloy, chromium, chromium alloy, nickel, nickel alloy, vanadium, vanadium alloy, tungsten, tungsten alloy, tungsten carbide, tantalum, tantalum alloy, molybdenum, molybdenum alloy, magnesium, magnesium alloy, gold, gold alloy, silver, silver alloy, ferrous alloy, stainless steel, steel, and an admixture thereof.

3. The three-dimensional printing kit of claim 1, wherein the metal particles are ferrous metal particles, ferrous alloy particles, or an admixture thereof.

4. The three-dimensional printing kit of claim 1, wherein the aqueous liquid vehicle includes an organic co-solvent, and wherein a weight ratio of the organic co-solvent to the acrylic polymer or copolymer latex dispersion ranges from about 1.2:1 to about 3:1.

5. The three-dimensional printing kit of claim 1, wherein the acrylic polymer or copolymer latex dispersion includes acrylate, styrene acrylate, methacrylate, styrene methacrylate, or a combination thereof.

6. The three-dimensional printing kit of claim 1, wherein the solubilized dihydrazide is selected from the group consisting of adipic dihydrazide, isophthalic dihydrazide, pentane dihydrazide, heptane dihydrazide, and a combination thereof.

7. The three-dimensional printing kit of claim 1, wherein the solubilized dihydrazide is present in the binder agent in an amount of from about 0.1 wt % to about 0.7 wt %.

8. The three-dimensional printing kit of claim 1, wherein the small-molecule dispersed pigment has an average particle size ranging from about 75 nm to about 150 nm.

9. The three-dimensional printing kit of claim 1, wherein the binder agent has a threshold conductivity limit ranging from about 200 μS/cm to about 450 μS/cm.

10. A three-dimensional printing system, comprising:

a particulate build material comprising from about 80 wt % to 100 wt % of metal particles based on a total weight of the particulate build material;

a printhead fluidly coupled to or fluidly coupleable to a binding agent to selectively and iteratively eject the binding agent onto successively placed individual layers of the particulate build material to form a green body object, the binder agent comprising:

an aqueous liquid vehicle;

an acrylic polymer or copolymer latex dispersion;

a sulfonated small-molecule dispersed pigment; and a solubilized dihydrazide, wherein a sulfonated small-molecule of the sulfonated small-molecule dispersed pigment has a molecular weight ranging from about 100 g/mol to about 2000 g/mol, and wherein the binder agent excludes a polymeric dispersant; and a fusing oven to receive the green body object and to heat fuse the metal particles of the green body object together to form a fused metal object.

11. The three-dimensional printing system of claim 10, wherein the metal particles are ferrous metal particles, ferrous alloy particles, or an admixture thereof.

12. The three-dimensional printing system of claim 10, wherein the solubilized dihydrazide is selected from the group consisting of adipic dihydrazide, isophthalic dihydrazide, pentane dihydrazide, heptane dihydrazide, and a combination thereof.

13. The three-dimensional printing system of claim 10, wherein the binder agent has a threshold conductivity limit ranging from about 200 μS/cm to about 450 μS/cm.

14. A method of three-dimensional printing, the method comprising:

iteratively applying individual build material layers of a particulate build material including from about 80 wt % to 100 wt % of metal particles based on a total weight of the particulate build material;

based on a three-dimensional object model, selectively and iteratively applying a binder agent including an aqueous liquid vehicle, an acrylic polymer or copolymer latex dispersion, a sulfonated small-molecule dispersed pigment, and a solubilized dihydrazide to the individual build material layers to define individually patterned layers of a green body object, wherein a sulfonated small-molecule of the sulfonated small-molecule dispersed pigment has a molecular weight of from about 100 g/mol to about 2000 g/mol, and wherein the binder agent excludes a polymeric dispersant; and fusing the metal particles of the three-dimensional green body object in a fusing oven.

15. The method of claim 14, wherein prior to the fusing, the method further comprises heating the individually patterned layers of the green body object to cure the green body object by driving off solvents therefrom.

* * * * *